United States Patent [19]

Hoover et al.

[11] 4,443,827

[45] Apr. 17, 1984

[54] TAPE CASSETTE

[75] Inventors: John W. Hoover, Huntington; Raymond C. Chapman, Ridgefield; Dominick F. Dammassa; Richard G. Rutkowski, both of Milford, all of Conn.

[73] Assignee: Dictaphone Corporation, Rye, N.Y.

[21] Appl. No.: 388,540

[22] Filed: Jun. 15, 1982

[51] Int. Cl.³ .............................................. G11B 23/08
[52] U.S. Cl. ................................ 360/132; 360/130.33; 242/199
[58] Field of Search ............... 360/132, 130.32, 130.33; 242/199

[56] References Cited

U.S. PATENT DOCUMENTS

| | | | |
|---|---|---|---|
| 3,940,799 | 2/1976 | Matsumoto et al. | 360/132 |
| 4,041,537 | 8/1977 | Kishi | 360/132 X |
| 4,205,809 | 6/1980 | Lau | 242/199 |
| 4,271,441 | 6/1981 | Greiner et al. | 360/130.33 |
| 4,368,497 | 1/1983 | Shirako | 360/132 |

Primary Examiner—John H. Wolff
Attorney, Agent, or Firm—Curtis, Morris & Safford

[57] ABSTRACT

A thumb-sized tape casette having a rectangular housing with top, bottom and peripheral walls and supply and take-up reels within the housing. A tape member runs between the reels and extends to a tape run parallel to and behind the front peripheral wall. The front wall has a center opening and side openings positioned on either side of the center opening through which the tape run is accessed. Holes in the top and bottom walls are coaxially aligned and are positioned behind the center opening of the front wall. A pair of notches is disposed in the top and bottom walls of the housing on opposite sides of the side openings of the front wall and spaced remotely from the center opening, these notches extending rearwardly into the housing from the front wall in respective parallel planes that are substantially perpendicular to the tape run. Each notch is operative to receive the tape guide that normally is mounted with the transducer of a tape record/reproducing device. The opposite ends of the front wall, at the corners thereof, are formed with respective recesses which define steps that serve to position the tape cassette in predetermined alignment when loaded into the record-/reproducing device.

13 Claims, 5 Drawing Figures

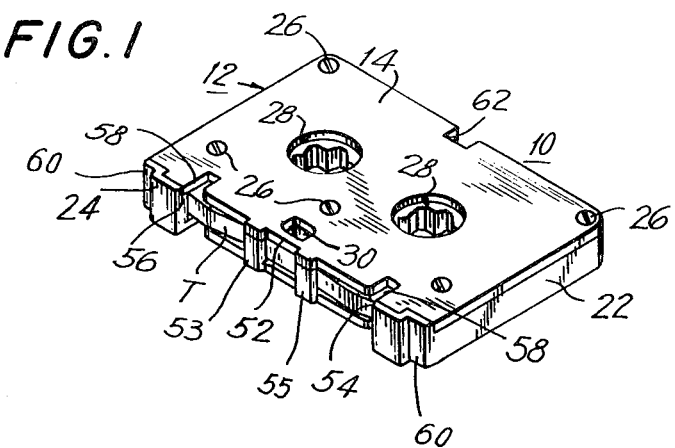
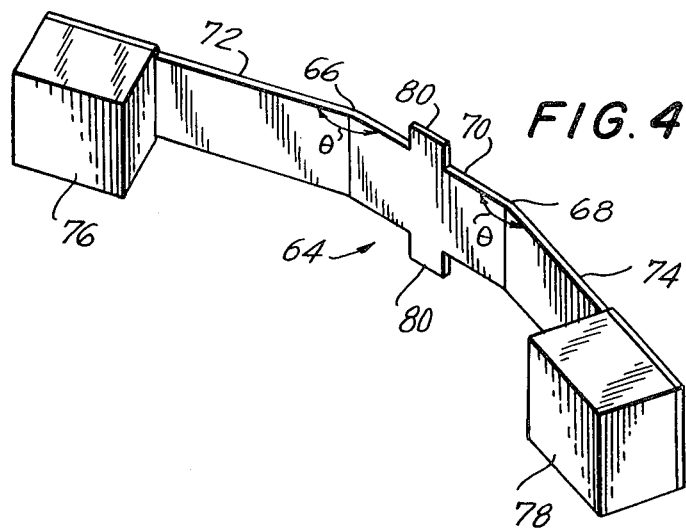
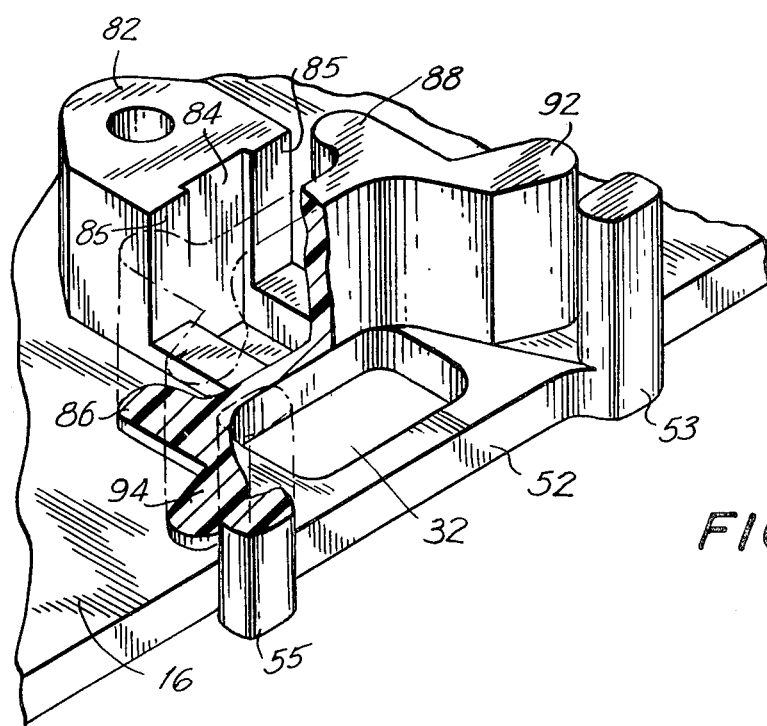

TAPE CASSETTE

BACKGROUND OF THE INVENTION

This invention relates to a tape cassette and, more particularly, to a thumb-sized tape cassette of extremely small dimensions which, nevertheless, provides an adequate recording capacity on a magnetic tape housed therewithin.

The use of magnetic tape cartridges to house magnetic tape upon which signals are recorded and reproduced is well known and advantageous. The cartridge provides a secure and protected environment for the magnetic tape housed therein. When housed in a cartridge, the magnetic tape may be easily loaded and removed from a record/reproducing device, may be easily transported and may be readily stored.

Various types and configurations of magnetic tape cartridges have been proposed and utilized. For example, so-called 8-track cartridges are provided with an endless reel of tape that is guided in a run across access ports, or openings, in a peripheral wall of the cartridge to enable suitable processing elements, such as transducers, capstans and the like to engage the tape. Another conventional tape cartridge is the so-called "standard" cassette. Typically, a standard cassette is a housed reel-to-reel device wherein magnetic tape is guided in a run between supply and take-up reels. A central opening in the front peripheral wall of the cassette is provided to receive the transducer, and opposite side openings in the front wall are provided to receive a pinch roller. Axially-aligned holes are provided in the top and bottom walls of the cassette to receive a capstan which is positioned behind the tape run and cooperates with the pinch roller inserted into a side opening so as to "pinch" the tape therebetween and drive the tape between the supply and take-up reels. To provide proper contact between the transducer and the magnetic tape, a pressure pad normally is spring-mounted behind the tape run in the vicinity of the central opening of the front peripheral wall. The tape is driven at a relatively low speed, such as on the order of about $1\frac{7}{8}$ inches per second.

In an effort to reduce the size of the "standard" cassette, the so-called "minicassette" has been developed. The minicassette also is a rectangular housed reel-to-reel tape device. However, in the minicassette, the supply and take-up reels are driven directly to transport the tape therebetween. The minicassette thus avoids the capstan-pinch roller arrangement. Unfortunately, in reducing the size of the cassette housing, the quantity of tape that may be stored therein also has been reduced. Whereas a typical "standard" cassette stores a sufficient quantity of tape so as to permit continuous recording of up to, for example, 90 minutes, the amount of tape housed within a typical "minicassette" is sufficient to permit continuous recording on the order of about twenty minutes.

In a still further attempt to reduce the size of the tape cartridge, the "microcassette" has been developed. Although substantially reduced in size relative to the "standard" cassette, the microcassette nevertheless is a capstan-driven, reel-to-reel tape device. The capstan is inserted immediately behind the central portion of the run of tape past the front peripheral wall, and this front wall is provided with numerous openings to receive a pinch roller and, on opposite sides of the pinch roller, one or more transducers. The speed at which the tape is transported has been reduced to 15/16 inches per second so as to obtain a continuous recording capacity on the order of about thirty minutes. A further speed reduction so as to effect a transport speed on the order of 15/32 inches per second has been achieved so as to double the recording capacity. However, at this very slow tape speed, the quality of the recorded signals, such as audio signals, is noticeably degraded.

It is desirable to provide a still further reduction in the size of a tape cassette yet not sacrifice the amount of continuous recording time that is available on that cassette and, moreover, to minimize degradation in the quality of the recorded signals that inherently occurs when the transport speed of the cassette tape is reduced. However, as the size of the tape housing is reduced, there is little, if any, room therein in which the usual tape guides, support ribs or pressure pad assembly may be provided. Furthermore, if substantially all of the housing is provided with tape, there is little, if any, room in which openings may be used for positioning the tape cassette when loaded into a tape record/reproducing device. Moreover, in view of the limited space within the housing, a symmetrical arrangement is desirable so that the cassette may be utilized, on either "side" by the same record/reproducing device, that is, signals may be recorded on both longitudinal halves of the tape, and still provide good contact between the tape and the transducer and also between the tape and the capstan-pinch roller combination.

OBJECTS OF THE INVENTION

Therefore, it is an object of the present invention to provide a thumb-sized tape cassette of extremely small size which achieves the aforenoted objectives and avoids the above-mentioned disadvantages.

Another object of this invention is to provide a very small tape cassette which houses a quantity of tape sufficient for at least one half hour of continuous recording, and permits "both sides" of the cassette to be utilized for recording.

A further object of this invention is to provide a tape cassette of extremely small size which is provided with various guide elements to position the cassette properly when loaded in a tape record/reproducing device and to receive a transducer in proper alignment for recording/reproducing on the tape.

An additional object of this invention is to provide a very small tape cassette of symmetrical construction so as to permit "both sides" thereof to be utilized, and which includes an improved pressure-pad spring and support assembly therefor.

Yet another object of this invention is to provide a very small tape cassette having a novel arrangement of tape tensioning means therein.

Various other objects, advantages and features of the present invention will become readily apparent from the ensuing detailed discussion, and the novel features will be particularly pointed out in the appended claims.

SUMMARY OF THE INVENTION

In accordance with this invention, a thumb-sized tape cassette is provided with a rectangular housing having supply and take-up reels therewithin with a tape member running between the reels and guided in a run behind the front peripheral wall of the housing. A respective tape guide roller is positioned within the housing in the vicinity of the front corners thereof for guiding the tape member to a tape run parallel to and behind the front wall. The front peripheral wall has a center opening and opposite side openings positioned on either side of the center opening. The center opening is adapted to receive a pinch roller when the tape cassette is loaded into a record/reproducing device; and each side opening is adapted to receive a transducer. The top and bottom walls of the housing are provided with coaxially-aligned holes which are positioned adjacent to the center opening of the front peripheral wall to receive a capstan when the tape cassette is loaded into the record/reproducing device. A pair of notches is disposed in the top and bottom walls on opposite sides of the side openings of the front peripheral wall, these notches being spaced remotely from the center opening and extending rearwardly into the housing in respective parallel planes that are substantially perpendicular to the tape run. Each notch is adapted to receive a tape guide that normally is mounted on the transducer. The front corners of the housing are recessed relative to the front peripheral wall so as to form respective steps which position the tape cassette in predetermined alignment when loaded into the record/reproducing device.

In one aspect of the invention, a pressure-pad spring is supported within the housing and is provided with a pair of pressure pads disposed behind the tape run and opposite the side openings of the front peripheral wall. The pressure-pad spring is formed of an integral, continuous surface leaf spring having only two bends therein to define a central section between the two bends with legs extending from the respective bends. A support post within the housing supports the central section of the leaf spring, and a pair of fulcrum posts also within the housing are positioned on opposite sides of the support posts to contact a surface of the leaf spring and provide a respective fulcrum for each leg.

Another aspect of this invention is to provide the fulcrum posts as part of a unitary bridge structure, the latter providing structural support for the housing in the vicinity of the center opening of the front peripheral wall. Advantageously, the bridge structure is shaped to substantially circumscribe the peripheral outline of the coaxially aligned holes in the housing.

A further aspect of this invention is to provide tape tensioning means within the housing to prevent inadvertent unwinding and spillage of the tape when the cassette is manipulated, shipped, etc.

BRIEF DESCRIPTION OF THE DRAWINGS

The following detailed description, given by way of example, will best be understood in conjunction with the accompanying drawings in which:

FIG. 1 is a perspective view of a tape cassette in accordance with the present invention;

FIG. 4 is a perspective view of the pressure-pad spring assembly used in the tape cassette; and FIG. 5 is a perspective view of the bridge structure used in the tape cassette.

DETAILED DESCRIPTION OF A PREFERRED EMBODIMENT

Figure 2:
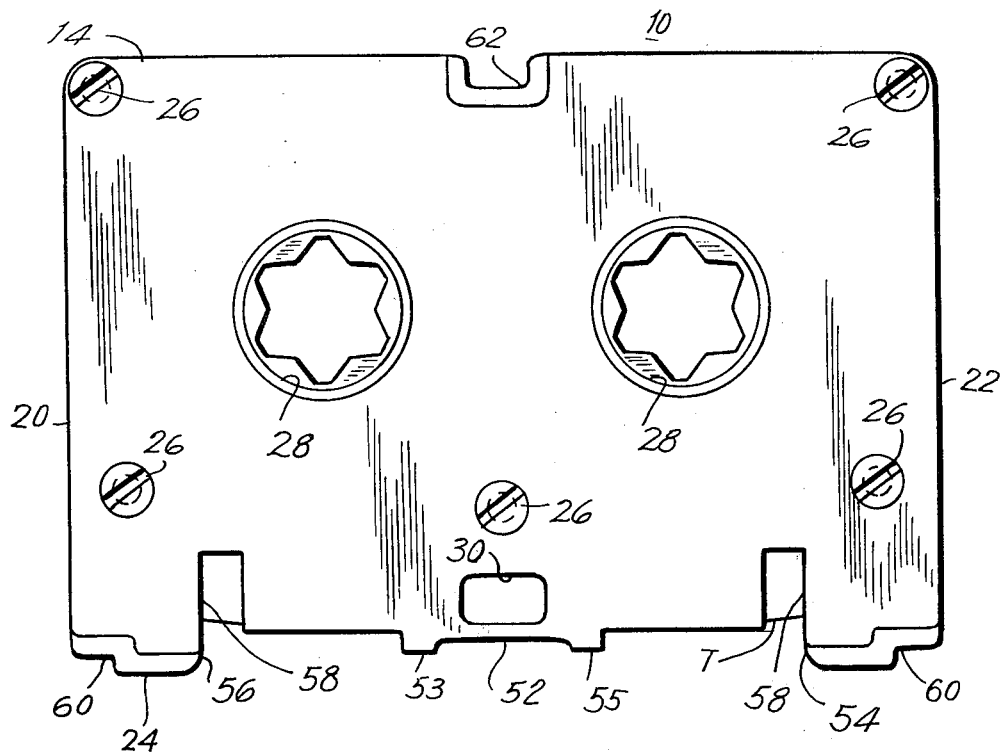
FIG. 2 is a top view of the tape cassette.
Figure 3:
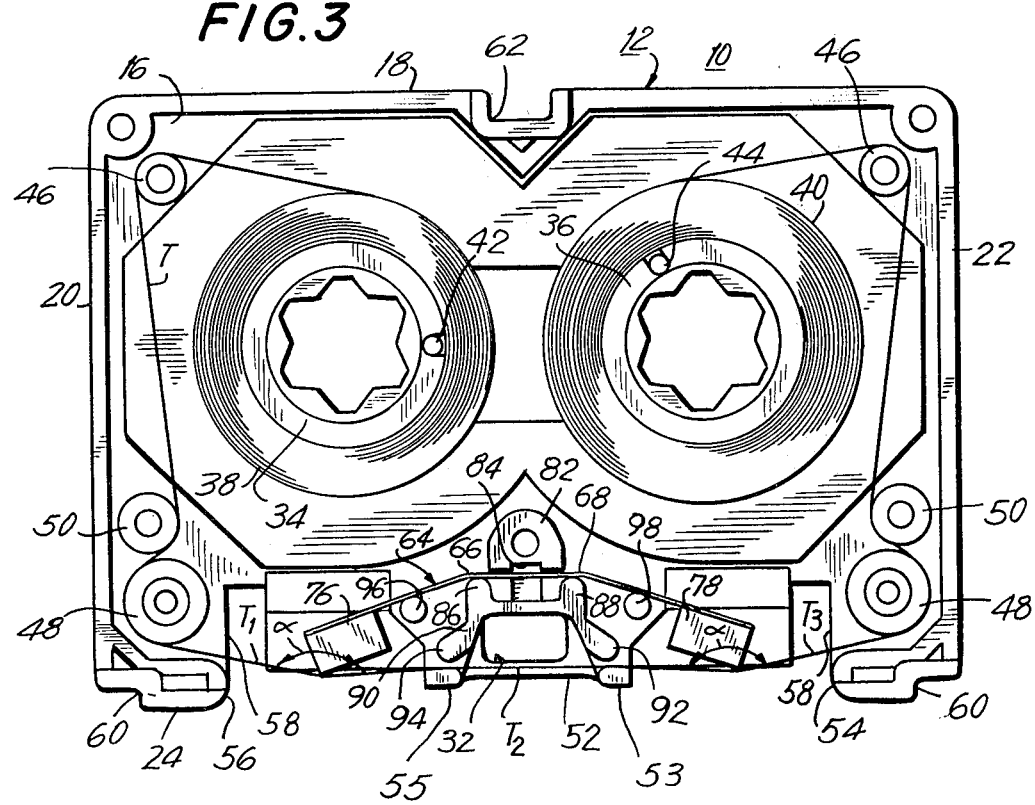
FIG. 3 is a top interior view of the tape cassette with the upper, or top wall thereof removed.

Referring now to the drawings, wherein like reference numerals are used throughout, and in particular to FIGS. 1-3, a preferred embodiment of the thumb-sized tape cassette 10 is illustrated. The cassette is formed of a rectangular housing 12 having a top wall 14, a bottom wall 16 (best shown in FIG. 3) and a peripheral wall. The peripheral wall includes a back portion 18, left and right side portions 20 and 22 and a front portion 24. It will be appreciated that tape cassette 10 is adapted to be loaded into a tape record/reproducing device in order to have information, such as audio signals, recorded on and reproduced from tape T housed within housing 12. As best shown in FIG. 1, housing 12 is provided with a plurality of openings 52, 54 and 56 in front peripheral wall 24 in order to permit suitable tape operating devices, such as transducers, pinch rollers, and the like, to contact the tape T. For the purpose of the present discussion, the front of the cassette is that portion which is provided with front wall 24, thereby providing a reference for the back, or rear portion as well as the left and right portions.

In one embodiment, the peripheral wall is integrally formed with bottom wall 16, and top wall 14 is assembled with the bottom and peripheral walls and secured thereto via suitable fastening means, such as screws 26. Alternatively, the peripheral wall may be integrally formed with the top wall; and in yet another embodiment, one-half of the peripheral wall may be integrally formed with the top wall and the other half may be integrally formed with the bottom wall. Also, other fastening means, such as ultrasonic welding, may be provided in place of screws 26 to assemble housing 12.

Top wall 14 is provided with reel openings, or holes, 28 symmetrically disposed in the left and right halves thereof, as best illustrated in FIG. 2. It will be appreciated that bottom wall 16 is provided with similar, reel openings that are axially aligned with holes 28. The purpose of such reel openings is to permit reel drive spindles provided on a suitable record/reproducing device to be inserted into housing 12 and engage tape reel hubs therewithin. As such spindles are driven, the tape reel hubs rotate so as to transport tape therebetween, as is well understood by those of ordinary skill in the art.

As illustrated in FIG. 2, top wall 14 is provided with a hole, or aperture, 30. A similar hole 32 is provided in bottom wall 16. Holes 30 and 32 are coaxially aligned, are positioned behind opening 52, and are adapted to receive a capstan which passes therethrough when cassette 10 is loaded into the tape record/reproducing device. Holes 30 and 32 merely are shaped to allow sufficient lateral play with respect to the capstan when the cassette is loaded into the device.

As shown in FIG. 3, housing 12 contains a pair of reel hubs 34 and 36 which, for ease of designation, are referred to as the supply and take-up reel hubs, respectively. It is appreciated that when the cassette is "turned over", the reel hub which had functioned as the supply reel hub now functions as the take-up reel hub. Each of the reel hubs is adapted to have a tape member T wound thereabout. Thus, successive turns of tape T on supply reel hub 34 form supply reel 38; and successive turns of the tape on take-up reel hub 36 form take-up reel 40. Tape T is secured, or fastened, at its opposite ends to each of supply and take-up reel hubs 34 and 36 by pins 42 and 44, respectively, these pins being inserted into suitable notches of the hubs.

It is appreciated that, during normal operation, such as a recording operation, tape T normally is fully wound upon supply reel hub 34 and then is driven from the supply reel to take-up reel hub 36. Of course, tape T is adapted to be bi-directionally driven between the supply and take-up reels so as to effect forward movement, such as normal slow movement for recording and playback of information, as well as fast-forward movement, and also to effect reverse movement, as when the tape is partially or fully rewound. Thus, tape T is movable between the supply and take-up reels so as to be unwound from one and wound upon the other.

Preferably as shown in FIG. 3, a respective guide roller is provided in the vicinity of each corner of housing 12. For example, a post may be formed integrally with bottom wall 16, and a rotatable sleeve may be assembled over that post so as to form the guide roller. In the illustrated embodiment, guide rollers 46 are provided at the rear-left and rear-right corners, and guide rollers 48 are provided at the front-left and front-right corners. Guide rollers 46 serve to pick off tape from the supply and take-up reels 38 and 40, respectively. Guide rollers 48 serve to define a tape run which, as shown in FIG. 1, is parallel to and behind front peripheral wall 24. Tape T thus is picked off from, for example, supply reel 38 by guide roller 46 and is guided about guide roller 48 to the tape run behind front peripheral wall 24, and then is guided by guide rollers 48 and 46 to the outermost turn of take-up reel 40.

In some tape cassettes which have been proposed heretofore, rear guide rollers 46 have been omitted. In such tape cassettes the tape path from each of the supply and take-up reels to the tape run is determined as a function of the diameter of the supply and take-up reels, respectively. As the diameter of each reel changes, the tape path correspondingly changes. This, in turn, may deleteriously affect the tape guided to and from the tape run. This potential difficulty is advantageously overcome by the use of guide rollers 46 because such guide rollers serve to define precisely the tape path to and from the tape run. Another advantage provided by the use of guide rollers 46 is to exert a tension on tape T to prevent the tape from unwinding and possibly spilling from the housing when the cassette is handled.

A pair of tape guide pins 50 are positioned adjacent the tape-run defining guide rollers 48, respectively. For example, guide pins 50 may be formed integrally with and extend upwardly from bottom wall 16. These pins provide a bend in the tape path from guide rollers 46 to guide rollers 48 so as to impart a substantially "S" shaped configuration to the tape in this path. This S-shaped deflection in the tape provides a suitable drag thereon when the tape is transported so as to insure uniform speed of the tape past the transducer. Furthermore, when the cassette is removed from the record/reproducing device, the drag imparted on tape T by guide pins 50 inhibits the tape from slackening in the tape run. This avoids the undesired possibility of tape jams when the cassette subsequently is loaded into the record/reproducing device and further prevents tape spillage when the cassette is handled.

As can be seen from FIG. 1, and as mentioned above, front peripheral wall 24 is provided with three openings, a center opening 52 and a pair of opposite side openings 54 and 56, the latter being positioned on either side of center opening 52, through which tape T may be accessed. Ribs 53 and 55 may be formed integrally with bottom wall 16 so as to define openings 52, 54 and 56, respectively.

When cassette 10 is loaded into a tape record/reproducing device, capstan holes 30 and 32 are adapted to receive the capstan provided in that device. Opening 52 is adapted to receive a pinch roller which, when actuated, engages tape T and cooperates with the capstan to transport the tape in the direction from supply reel 38 to take-up reel 40. Furthermore, a transducer, such as a recording and/or playback head, is adapted to be inserted through opening 56 into contact with tape T so as to record and/or reproduce signals therefrom. It is appreciated that, when cassette 10 is "turned over", the capstan still passes through holes 30 and 32 and the pinch roller still engages tape T through opening 52. Now, however, the transducer is inserted into opening 54 to contact the tape.

Top wall 14 and bottom wall 16 are provided with a pair of notches 58 which extend rearwardly from the front portions thereof, as best shown in FIG. 2. Notches 58 are seen to be positioned on opposite sides of side openings 54 and 56, and these notches are spaced remotely from center opening 52. Furthermore, notches 58 may be thought of as extending in parallel planes that are substantially perpendicular to the run of tape which passes behind the openings of front peripheral wall 24. Notches 58 are adapted to receive the usual bifurcated tape guide which normally is mounted on the transducer for capturing tape T therebetween so as to guide the tape as it passes the transducer. As shown in FIG. 1, the width of tape T is such that very little, if any, clearance is provided between the longitudinal edges of the tape and each of top and bottom walls 14 and 16. Hence, there is no room within housing 12 to receive the bifurcated tape guide member. It is for this reason that notches 58 are provided, thereby accommodating the legs of such bifurcated tape guide.

The front left and front right corners of housing 12 are provided with recesses 60, as shown in FIGS. 1-3. That is, the opposite ends of front peripheral wall 24 are recessed at the corners formed between such front peripheral wall and each of side peripheral walls 20 and 22 so as to form respective steps at the corners. These stepped portions function to position cassette 10 in predetermined alignment when the cassette is loaded into the tape record/reproducing device. That is, recesses 60 serve to abut suitable stops, or guides in the device, thereby establishing the proper alignment of the cassette in the device. In addition, a guide notch 62 is formed in back peripheral wall 18 to receive a suitable guide member normally provided on the tape record/reproducing device. The use of recesses 60 and guide notch 62 for positioning the cassette differs from the positioning means of cassettes which have been designed heretofore in that the interior space of such earlier cassettes provided sufficient room to receive guide pins or posts that had been provided on the tape recording devices. However, the small size of the present cassette, taken in combination with the relatively large quantity of tape that may be housed therewithin, minimizes the space available to receive such guide pins or posts. Recesses 60 and guide notch 62 provide sufficient positioning structure without requiring the insertion of guide elements into the housing. Hence, the space within housing 12 is preserved for its intended function—the housing of tape T.

Cassette 10 also is provided with a pressure-pad spring 64 shown in perspective in FIG. 4. Pressure-pad spring 64 has pressure pads 76 and 78 secured thereto, as by cement or other suitable adhesive, and is positioned in the interior of housing 12 such that the pressure pads are disposed immediately behind side openings 54 and 56. The purpose of pressure pads 76 and 78 is to urge tape T outwardly, or in the forward direction, of housing 12 to insure good contact between the surface of tape T and the transducer that is adapted to be inserted into the side opening so as to record and/or reproduce signals.

The pressure-pad spring is formed as an integral, continuous-surfaced leaf spring having a substantially planar central section 70 and a pair of legs 72 and 74 which are bent from central section 70 and extend outwardly therefrom. In particular, the leaf spring has only two bends 66 and 68 which define central section 70. As a result of bends 66 and 68, central section 70 forms, with each of legs 72 and 74, substantially equal, obtuse angles $\theta$. In one embodiment, the obtuse angle $\theta$ is on the order of about 160° to 165°. As illustrated, pressure pads 76 and 78 are secured to the free ends of legs 72 and 74.

It will be appreciated that pressure-pad spring 64 is of relatively simple construction and is easy to manufacture. This pressure-pad spring differs from those used in earlier cassettes in which such spring structures had been provided with multiple bends (e. g. four) forming a generally U-shaped central section which, of course, requires careful stamping or forming to manufacture. Also, such spring structures had been provided with discontinuities in its surface, such as bumps, dimples and the like, which are omitted from pressure-pad spring 64 of this invention.

Central section 70 of pressure-pad spring 64 is provided with a pair of tabs 80 which are disposed on opposite longitudinal edges of the leaf spring. These tabs serve to fit into a notch provided on a support post within housing 12. As shown in FIGS. 3 and 5, support post 82 is formed integrally with, for example, bottom wall 16 and, preferably, includes a planar surface in which a cut-out 84 is provided to form legs 85. It is seen (FIG. 3) that tabs 80 are received by cut-out 84 so as to position and stabilize pressure-pad spring 64. Legs 85 are adapted to contact the rear surface of central section 70 of pressure-pad spring 64. It is recognized that the "rear surface" of the spring is, of course, that surface thereof which faces the rear of cassette 10.

A pair of fulcrum posts 86 and 88 are positioned adjacent legs 85 of support post 82 and serve to provide respective fulcrums for pressure-pad spring 64. Fulcrum posts 86 and 88 are positioned on opposite sides of support post 82 and are adapted to contact the front surface of the pressure-pad spring so as to provide a respective fulcrum for each leg 72 and 74. In the illustrated embodiment, fulcrum post 86 contacts the front surface of central section 70 of the leaf spring adjacent bend 66, and fulcrum post 88 contacts the front surface of the central section adjacent bend 68. Thus, the bends lie between each fulcrum post and a respective one of legs 72 and 74.

Stated otherwise, fulcrum posts 86 and 88 are positioned on either side of an axial plane of support post 82, this axial plane being substantially perpendicular to the run of tape T.

Fulcrum posts 86 and 88 are formed as integral portions of a unitary bridge structure 90. The bridge is positioned between support post 82 and coaxially aligned cassette holes 30 and 32. Furthermore, the shape of the bridge is such that, when viewed from the top of cassette 10, the bridge substantially circumscribes a peripheral portion of the oval-shaped cassette holes. Bridge structure 90 terminates in tape guides 92 and 94, which tape guides are positioned immediately behind tape T and are aligned with ribs 53 and 55, respectively.

Bridge 90 is interposed between top and bottom walls 14 and 16 and provides structural support and rigidity between those walls at the front portion of housing 12 and in the vicinity of center opening 52 of the front peripheral wall.

Tape guides 92 and 94 of bridge 90 function to prevent tape T from being deflected from its run inwardly into housing 12. Thus, the tape remains free of capstan holes 30 and 32 such that cassette 10 may be easily loaded into a tape record/reproducing device with little chance of a tape jam or tape displacement that would position the tape behind the capstan when the cassette is loaded into the record/reproducing device.

A pair of stop posts 96 and 98 are formed with bottom wall 16 and extend upwardly therefrom toward top wall 14. As shown in FIG. 3, stop post 96 is adapted to contact the front surface of leg 72 and, similarly, stop post 98 is adapted to contact the front surface of leg 74. Thus, the stop posts tend to restrain forward, bending movement of legs 72 and 74 about the fulcrums formed by fulcrum posts 66 and 68, respectively. It is seen that fulcrum posts 86 and 88 and stop posts 96 and 98 all contact the same surface of the pressure-pad spring, whereas support post 82 is adapted to contact the opposite surface thereof.

The provision of bends 66 and 68 in cooperation with fulcrum posts 86 and 88 provide contact between each of pressure pads 76 and 78 with tape T. As a result of this contact, tape T is biased from its tape run which, in the absence of the spring-biased pressure pads would extend completely parallel to front peripheral wall 24 between guide rollers 48. However, because of the spring-biased urging in the outward direction, the tape run is formed of a first section $T_1$ which extends from the left-hand guide roller 48 to pressure pad 76, followed by a second section $T_2$ which extends from pressure pad 76 to pressure pad 78 and is substantially parallel to the front peripheral wall, followed by a third section $T_3$ which extends from pressure pad 78 to the other guide roller 48. It is seen that sections $T_1$ and $T_3$ form equal obtuse angles of slightly less than 180° with section $T_2$.

A desired spring biasing of pressure pads 76 and 78 is attained without the use of dimples, bumps or nipples which heretofore has been formed on the leaf spring member which was used in earlier cassettes as the pressure-pad spring. This further simplifies the manufacture of the pressure-pad spring, the assembly of that spring within housing 12 and, thus, the manufacture and assembly of cassette 10.

While the present invention has been particularly shown and described with reference to a preferred embodiment, it should be readily appreciated by those of ordinary skill in the art that various changes and modifications in form and details may be made without departing from the spirit and scope of the invention. For example, slip-sheets may be provided on the interior surfaces of one or both of the top and bottom walls of housing 12 so as to facilitate the friction-free movement of tape. Furthermore, although pressure-pad spring 64 has been illustrated as being formed with two opposite tabs 80, only a single tab may be used, if desired. This is because support post 82 is provided with a symmetrically disposed cut-out 84. That is, the cut-out is provided in the planar face, or surface of the support post substantially in the middle thereof. Further, although various pins, posts and bridge structures have been described as being formed integrally with the bottom wall of housing 12, it is readily appreciated that such elements may be formed integrally with the top wall thereof. Also, the use of capstan holes 32, rather than a simple cut-out portion in the top and bottom walls of housing 12, serves to prevent cassette 10 from moving in a direction such that the capstan of the record/reproducing device is brought into contact with tape T. Rather, contact between the tape and capstan is brought about only when the pinch roller is inserted into center opening 52.

As a numerical example, cassette 10 may be about 1.4 inches wide, less than 1 inch deep, and about 0.16 inches high.

It is intended that the appended claims be interpreted as including the foregoing as well as various other changes and modifications.

What is claimed is:

1. In a thumb-sized tape cassette having a rectangular housing formed of top and bottom walls and a peripheral wall extending between said top and bottom walls, said peripheral wall having front, back and side portions; supply and take-up reel hubs contained within said housing; a tape member wound about respective ones of said hubs to form supply and take-up reels and movable therebetween to be unwound from one and wound upon the other; a pair of tape guide rollers positioned within said housing in the vicinity of the front corners of said housing for guiding said tape member thereabout and defining a tape run parallel to and behind said front portion of said peripheral wall; said front portion of said peripheral wall having at least a center and opposite side openings therein through which said tape run is accessed, said side openings being positioned on either side of said center opening, each side opening being operative to receive a transducer to contact said tape member and said center opening being operative to receive a pinch roller when said tape cassette is loaded into a tape record and/or playback device; a hole in each of said top and bottom walls coaxially aligned and positioned adjacent the center opening of said front position of said peripheral wall to receive a capstan when said tape cassette is loaded into said device; the improvement comprising a pair of notches disposed in said top and bottom walls on opposite sides of said side openings of said front portion of said peripheral wall and spaced remotely from said center opening, said notches extending rearwardly into said housing from said front portion in parallel planes that are substantially perpendicular to said tape run, whereby when said tape cassette is operatively loaded into said device, either notch receives a bifurcated tape guide normally mounted with said transducer; and the opposite ends of said front portion of said peripheral wall at the corners formed with the respective side portions are recessed relative to the part of said front portion adjacent thereto so as to form respective steps at said corners, whereby when said tape cassette is loaded into said device said steps cooperate with guide means in said device to position said tape cassette in predetermined alignment.

2. The tape cassette of claim 1 further comprising a pressure-pad spring, means for supporting said pressure-pad spring within said housing; and a pair of pressure pads secured to said pressure-pad spring and disposed behind said tape run adjacent the opposite side openings of said front portion of said peripheral wall.

3. The tape cassette of claim 2 wherein said pressure pads contact said tape member and urge the tape member in the outward direction of said housing such that said tape run is formed of a first section from one of said tape run defining guide rollers to one of said pressure pads, a second section from said one pressure pad to the other pressure pad, and a third section from said other pressure pad to the other of said tape run defining guide rollers, said first and third sections forming equal obtuse angles with said second section.

4. The tape cassette of claim 2 wherein said pressure-pad spring is comprised of an integral leaf spring member having a substantially planar central section and legs bent from said planar central section; said pressure pads being secured to the free ends of said legs.

5. The tape cassette of claim 4 wherein said means for supporting said pressure-pad spring within said housing comprises a support post extending from one of said top and bottom walls toward the other for supporting said central section of said pressure-pad spring, said support post being positioned behind said coaxially aligned holes; and a pair of fulcrum posts positioned on either side of an axial plane of said support post, each fulcrum post defining a fulcrum for said central section of said leaf spring member adjacent the bend at a respective leg.

6. The tape cassette of claim 5 further comprising a pair of stop posts within said housing, each stop post extending from one of said top and bottom walls toward the other and cooperable with a respective fulcrum post to restrain a respective leg of said leaf spring member.

7. The apparatus of claim 6 wherein all of said fulcrum and stop posts engage the same surface of said leaf spring member and said support post engages the opposite surface thereof.

8. The tape cassette of claim 5 wherein said support post is provided with a symmetrically disposed cut-out, and the central section of said leaf spring member includes at least one tab received by said cut-out.

9. The tape cassette of claim 1 further comprising a respective tape guide means adjacent each of said tape run defining guide rollers to impart a substantially "S" shaped configuration to the tape extending from one of said other guide rollers to said tape run defining guide roller.

10. The tape cassette of claim 1 further comprising a second pair of tape guide rollers positioned within said housing in the vicinity of the rear corners of said housing for picking tape off said supply and take-up reels, respectively, and thereby impart a tension to said tape run to minimize unwinding and spillage of said tape when said tape cassette is handled.

11. The tape cassette of claim 1 wherein each of said notches extends fully through the top and bottom walls of said housing.

12. In a thumb-sized tape cassette having a rectangular housing formed of top and bottom walls and a peripheral wall extending between said top and bottom walls, said peripheral wall having front, back and side portions; supply and take-up reel hubs contained within said housing; a tape member wound about respective ones of said hubs to form supply and take-up reels and movable therebetween to be unwound from one and wound upon the other; a pair of tape guide rollers positioned within said housing in the vicinity of the front corners of said housing for guiding said tape member thereabout and defining a tape run parallel to and behind said front portion of said peripheral wall; and front portion of said peripheral wall having at least a center and opposite side openings therein through which said tape run is accessed, said side openings being positioned on either side of said center opening, each side opening being operative to receive a transducer to contact said tape member and said center opening being operative to receive a pinch roller when said tape cassette is loaded into a tape record and/or playback device; a hole in each of said top and bottom walls coaxially aligned and positioned adjacent the center opening of said front portion of said peripheral wall to receive a capstan when said tape cassette is loaded into said device; the improvement comprising cassette alignment means having guide means disposed in said back portion of said peripheral wall for cooperating with a guide member normally provided in said device; and respective steps provided at the opposite ends of said front portion of said peripheral wall at the corners formed with the respective side portions by recessing said opposite ends of said front portion relative to the part of said front portion adjacent thereto, whereby when said tape cassette is loaded into said device said cassette alignment means interacts with guide members normally provided in said device to position said tape cassette in predetermined alignment without requiring the insertion of said guide members into the housing of said cassette.

13. The tape cassette of claim 1 wherein the width of said housing is less than about 1½ inches, the depth of said housing is less than about 1 inch and the height of said housing is less than about ¼ inch.

* * * * *

UNITED STATES PATENT AND TRADEMARK OFFICE
CERTIFICATE OF CORRECTION

PATENT NO. : 4,443,827
DATED : April 17, 1984
INVENTOR(S) : John W. Hoover et al.

It is certified that error appears in the above-identified patent and that said Letters Patent are hereby corrected as shown below:

Claim 12, column 10, line 65, after semicolon, "and front" should be --said front--.

Signed and Sealed this

Twenty-eighth Day of August 1984

[SEAL]

Attest:

GERALD J. MOSSINGHOFF

Attesting Officer — Commissioner of Patents and Trademarks